United States Patent
Love et al.

(10) Patent No.: US 10,412,467 B2
(45) Date of Patent: Sep. 10, 2019

(54) PERSONALIZED LIVE MEDIA CONTENT

(71) Applicant: Amazon Technologies, Inc., Seattle, WA (US)

(72) Inventors: Brandon Scott Love, Seattle, WA (US); Joshua Danovitz, Seattle, WA (US); Lars Christian Ulness, Seattle, WA (US); Felicia Yue, Mukilteo, WA (US); Alexandria Way-Wun Kravis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/699,899

(22) Filed: Sep. 8, 2017

(65) Prior Publication Data

US 2019/0082233 A1    Mar. 14, 2019

(51) Int. Cl.
| | |
|---|---|
| H04N 21/81 | (2011.01) |
| H04N 21/218 | (2011.01) |
| H04N 21/2187 | (2011.01) |
| H04N 21/25 | (2011.01) |
| H04N 21/2668 | (2011.01) |
| H04N 21/472 | (2011.01) |

(52) U.S. Cl.
CPC ..... H04N 21/8126 (2013.01); H04N 21/2187 (2013.01); H04N 21/21805 (2013.01); H04N 21/252 (2013.01); H04N 21/2668 (2013.01); H04N 21/472 (2013.01); H04N 21/8133 (2013.01)

(58) Field of Classification Search
None
See application file for complete search history.

(56) References Cited

U.S. PATENT DOCUMENTS

| | | | |
|---|---|---|---|
| 5,745,126 A | 4/1998 | Jain et al. | |
| 7,152,209 B2 * | 12/2006 | Jojic | G06F 17/30825 715/720 |
| 2016/0080830 A1 * | 3/2016 | Kim | H04N 21/8133 725/19 |
| 2016/0367891 A1 | 12/2016 | Trehan | |

FOREIGN PATENT DOCUMENTS

| | | |
|---|---|---|
| WO | WO 2003/010966 A1 | 2/2003 |
| WO | WO 2017/034767 | 3/2017 |

OTHER PUBLICATIONS

Chen, et al., "Hierarchical Grid-based People Tracking with Multi-camera Setup" *Computer Vision, Imaging and Computer Graphics. Theory and Applications* pp. 187-202, 2011.
Kravets, David, "How the NFL—not the NSA—is impacting data gathering well beyond the gridiron" https://arstechnica.com/tech-policy/2015/09/the/nfl-is-reshaping-the-surveillance-society-xbox-one-experience-and-gambling/, pp. 1-4, Jul. 11, 2017.
Mandeljc, et al., "Tracking by Identification Using Computer Vision and Radio" *Sensors* 13:241-273, 2013.
"Data Sheet" *Zebra Sports Solutions* pp. 1-6, 2015.
PCT International Search Report and Written Opinion dated Oct. 24, 2018 issued in PCT/US18/49789.

* cited by examiner

*Primary Examiner* — Hunter B Lonsberry
*Assistant Examiner* — Charles N Hicks
(74) *Attorney, Agent, or Firm* — Weaver Austin Villeneuve & Sampson LLP

(57) ABSTRACT

Techniques are described that enable personalized live media content.

18 Claims, 4 Drawing Sheets

PERSONALIZED LIVE MEDIA CONTENT

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at optimizing the quality of the media content provided.

Live streaming media content includes channels or feeds with live events (e.g., sporting events, news, concerts, etc.). When multiple sources are used to generate media content for a live event, such as using multiple cameras to provide different perspectives on an athletic event, only a portion of the media content may be provided to viewers. Different viewers of the live event may be interested in different portions of the media content for the live event.

Unfortunately, generating personalized live media content complicates infrastructure requirements and increases cost of delivery.

DETAILED DESCRIPTION

This disclosure describes techniques for delivery of personalized live streaming media content.

These techniques include receiving position information for a participant of a live event. The received position information is used to identify sources of media content that include or correspond to the participant, such as, for example, identifying that a camera filming a live event has a field of view that includes the participant. When a request from a device to view the live event identifies the participant, media content that include or correspond to the participant are used to generate a personalized live stream. The position information, together with the identified media content may also be used to derive context specific information based on the type of live event. For example, a fumble event can be identified for a National Football League (NFL) game, or a penalty shootout can be identified for a soccer game. Participants and context specific events to highlight can be based on selections indicated by the device, or inferred based on profiles and histories associated with a user of the device. Some of the disclosed techniques also involve augmenting the personalized live media content with metadata including analytics based on the position information for the participant. The metadata is used to personalize the user interface, such as with infographics, tutorials, and accessibility features. The metadata can also be used to enhance the interactivity of the media content, such as by gamification and/or integration with fantasy sports and wagering services.

An NFL game is one example of a live event contemplated by the disclosed techniques. A live event such as an NFL game is filmed by multiple cameras. A regular-season game may have 22 cameras, whereas a Super Bowl event may have up to 65 cameras. Viewers of an NFL game may be interested in a specific player on the field of play, such as based on being a fan of a player, a fantasy sports profile, or a bet on a player. Typically, the media organization providing coverage of the NFL game will select a limited number of players that are the focus of media content to stream to a wide variety of viewers, regardless of each viewer's specific player interests. Therefore, the player emphasis in delivered media content may not necessarily match the viewer's interest.

The present disclosure describes techniques to personalize live media content using systems and methods that utilize positioning systems.

Figure 1:
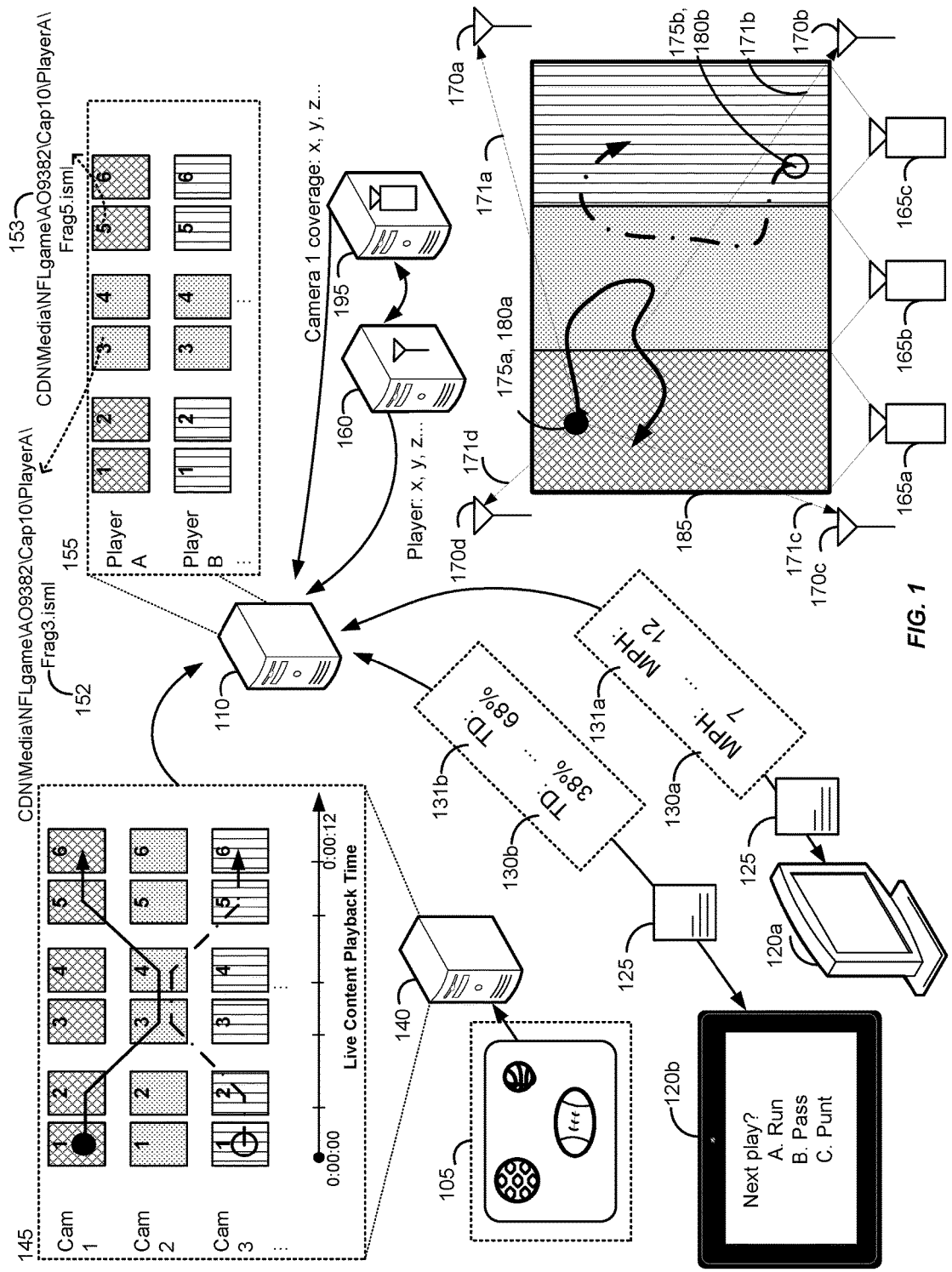
FIG. 1 illustrates an example of providing personalized live streaming media.

FIG. 1 illustrates an example of providing personalized live media content as described herein. Viewer devices 120a and 120b are electronic devices (a television and a tablet, respectively) that are provided manifest data 125 to request fragments from among stored fragments 155 from media server 110 to enable playback of a live stream of media content 105.

Media content 105 is an NFL game available for live streaming playback. Though the example described herein is in the context of an NFL game, media content 105 can correspond to other athletic events, such as a soccer game, baseball game, basketball game, and so forth. More broadly, media content 105 can include live events in stadiums, fields, performance halls and other venues where cameras (e.g., 165a-c) and positioning sensors (e.g., 170a-d) can be deployed. In certain implementations, such as positioning systems that only use inertial sensing, deploying positioning sensors may not be required.

The NFL game represented by media content 105 is taking place on field of play 185. Field of play 185 is being filmed by three cameras, cameras 165a-c. The field of view for camera 165a is represented by the crosshatched portion of field of play 185, and similarly, for camera 165b by the dotted portion, and for camera 165c by the vertical lined portion. While the respective bounding polygons for the fields of view in FIG. 1 are depicted as nonoverlapping rectangles for clarity purposes, it should be appreciated that fields of view are not necessarily rectangular, and furthermore may overlap.

Cameras 165a-c are also depicted in FIG. 1 as having static fields of view, meaning the field of view for each camera remains constant throughout the duration of the live event. In some implementations, a particular camera can have a dynamic field of view, which is a field of view that can vary throughout the duration of the live event. For example, the field of view can be varied by adjusting the pan-tilt-zoom configuration. For certain implementations, cameras can be mounted on the participants themselves or other moving apparatus.

Positioning server 160 provides information to media server 110, such as the positions of player A 175a, represented by the black filled circle in the crosshatched portion of field of play 185, and player B 175B, as represented by the unfilled circle. Positions can be formatted by positioning server 160 as x, y and z coordinates that are updated frequently, e.g., several times per second. Positions are estimated by positioning server 160 using the characteristics of a signal transmitted by tag 180a located on player A, and received by positioning sensors 170a-d. Positioning server 160 and the positioning sensors 170a-d can communicate by wired and/or wireless connections.

Characteristics of the signals between tag 180a and positioning sensors 170a-d (represented by 171a-d) that can be used for determining the position of player A include received signal strength, time of arrival, angle of arrival, time difference of arrival, and so forth. The characteristics of signals 171a-d are collectively processed, such as by triangulation, to determine the position of tag 180a. Though not depicted, signals received by positioning sensors 170a-d for tag 180b on player B are processed similarly. It should be appreciated that the number and location of positioning sensors 170a-d are for illustrative purposes, and various implementations of the disclosed techniques may have different locations and quantities of positioning sensors. Similarly, each player whose position is being estimated may have multiple tags. As illustrated in FIG. 1, a sequence of position estimates generated by positioning server 160 tracks the movement of player A from the crosshatched portion to the dotted portion, and back to the crosshatched portion. Similarly, positioning server 160 provides outputs to track the movement of player B between the vertical lined and dotted portion of field of play 185.

Camera server 195 provides information to media server 110 such as, for example, the coordinates delimiting the field of view for cameras 165a-c. For example, a bounding polygon denoted with a vector of coordinates x1, y1 . . . xn, yn can be used to convey to media server 110 the portion of field of play 185 that is observable by camera 165a, as illustrated by the crosshatched portion. It should be appreciated that rather than a bounding polygon, a field of view can be represented as a list of coordinates included in the field of view. When positioning server 160 outputs a coordinate for player A 175a that corresponds to a listed coordinate, or is within a 2-dimensional bounding polygon or 3-dimensional bounding polyhedron, specified for camera 165a at a time t1, media server 110 can determine that player A 175a is visible in the video stream generated by camera 165a at the time t1. Camera server 195 also provides information such as the coordinates of the centroid of the polygon representing a field of view to allow calculation of how close a player within the field of view is to the periphery of the field of view. This can assist in determining which camera to select from when a player is visible in multiple fields of view or is moving from one field of view to another. Camera server 195 can also provide pan-tilt-zoom feedback and control functions for cameras with dynamic fields of view. For example, camera server 195 can use position information for player A that is received from positioning server 160 to automatically control a camera with pan-tilt-zoom capabilities (not shown in FIG. 1) that is dedicated to tracking player A. In certain implementations, a subset of the cameras can have static fields of view, and a subset of the cameras can have dynamic fields of view. It should be appreciated that alternative sensory apparatuses such as, for example, microphones or photographic cameras can be used in place of video cameras.

As the live event is recorded, fragment server 140 receives video data from each camera and generates fragments 145. Fragment server 140 encodes the video data from each camera at various video quality representations (e.g., CBR cap levels 10, 7, 3 Mbps). Fragment server 140 can use constant bit rate encoding or variable bit rate encoding. Constant bit rate (CBR) encoding attempts to maintain a constant average bit rate for the entire media content. Variable bit rate (VBR) encoding analyzes the media content and adapts the bit rate to match the complexity of the media content being encoded.

In FIG. 1, an encoded video fragment is represented by a tile icon. A group of tile icons with the same fill pattern is an abstraction of a sequence of video fragments corresponding to an encoding of segments, or portions, of media content 105 from a particular field of view. For example, fragments 145 include tile icons with three different fill patterns (crosshatching, dotted, and vertical lines), which depict fragments that contain three different camera angles, or fields of view, for the same live event. In fragments 145, the crosshatched, dotted, and vertical line filled tile icons correspond to the encoded fragments for cameras 165a-c, labeled as Cam 1-3, respectively. For example, the six crosshatched shapes for Cam 1 represent video time segments 1-6 encoded at a particular quality level for a contiguous time interval of 12 seconds, as depicted by the time axis labeled "Live Content Playback Time." All six encoded fragments have the same field of view, corresponding to the crosshatched portion of field of play 185.

Referring to the solid trace on field of play 185, over the course of the 12 seconds, player A has run back and forth between the crosshatched region and the dotted region of field of play 185. This deviation between the field of view of Cam 1 and the position of player A over the 12 seconds is illustrated on fragments 145 using the solid trace, which depicts the movement of player A between video fragments for Cam 1 for seconds 0-4 and 8-12, and Cam 2 for seconds 4-8. A similar concept applies to the dashed trace shown on field of play 185 and fragments 145, representing the position of player B. A live stream for player A requires splicing, or generating a temporal sequence, of video fragments from different camera feeds. It should be appreciated that for implementations using a pan-tilt-zoom to track a player, such as player A, splicing from different cameras is not required to ensure that player A is always visible. However, splicing with other camera feeds that include player A and that have a better view angle, such as a frontal view rather than a rear view, improves the live stream being provided to a device.

The icons in stored fragments 155 represent the encoded fragments, either as discrete files or byte ranges within files, that are either stored at an origin server such as media server 110, or distributed in a content delivery system (CDN). Media server 110 generates manifest data 125, which indicates a schema for requesting fragments from the different network locations at which stored fragments 155 are located. The manifest data (e.g., one or more markup files, other types of data structures, data provided over an API, etc.), provide playback options for the live stream by providing metadata that allows a viewer device to generate properly formatted requests for specific fragments, or portions, of the media content. The viewer devices use the manifest data to generate a uniform resource locator (URL) that includes, for example, a query string indicating the specific fragment to be provided in response to the request. As will be appreciated, such a request may be directed to a server other than media server 110, or a plurality of media servers. The schema may be represented as a template describing an HTTP request where different strings within the HTTP address specify parameters, such as the host, channel, quality level (e.g., CBR cap), fragment index, and specific player in the NFL game being watched. A player identification is used to identify an attribute of the live stream being requested, similar to how a bit rate is used to identify an attribute. The availability of a particular player in manifest data 125 can be based on a subscription level associated with a viewer device. Similarly, fewer players can be provided if network conditions do not support streaming of numerous different streams, each stream corresponding to a different player. Certain implementations can include other HTTP parameters corresponding to live streams tracking assets or objects that are of interest, such as officiating personnel, coaches, team staff, the ball in play, and so forth.

One example of a request is: "CDN\Media\NFLgame\AO9382\Cap10\PlayerA\Frag3.isml." The request specifies a host with "CDN\media," a channel with "\NFLgame\AO9382," a quality level with "\Cap10," a player of interest with "\PlayerA," and a fragment index with "\Frag3.isml" In implementations where each fragment has a fixed fragment length and provides two seconds of playback, the next fragment to be requested would have an index of 4, corresponding to a time code associated with 0 hours, 0 minutes, 8 seconds. By incrementing the fragment index, subsequent fragments containing the same player can be requested.

As an illustration, FIG. 1 depicts stored fragment 152 as a dotted tile, which corresponds to Cam 1, and stored fragment 153 as a crosshatched tile, which corresponds to Cam 2. As the index value is incremented from 3 to 4, the next stored fragment remains a dotted tile, meaning the tracked player has not moved to a different camera. As the index value is incremented from 4 to 5, the stored fragment now corresponds to a crosshatched tile, meaning the player has moved from Cam 2 to Cam 1. For both scenarios, when the player remains in the same camera field of view, and when the player moves to a different camera field of view, the viewer device is modifying the URL for the fragment request by incrementing the index, in contrast to specifying a camera. In some implementations, the duration of playback provided by a fragment may differ. In other implementations, the numerical index is a variable time code or time range for the fragment, and a manifest refresh indicates the specific parameters of the URL to request the subsequent stored fragment having the player of interest. It should be appreciated that manifest data 125 can also include fragments for other types of media, such as audio, subtitles, and other playback options.

In FIG. 1, stored fragments 155 include a group of six encoded fragments labeled 1-6 in the row labeled Player A. This abstraction of a group of six encoded fragments stored at network locations addressable by the schema in manifest data 125 corresponds to the fill patterns of the icons traversed by the solid trace in fragments 145. A similar interpretation applies to the row of fragments in stored fragments 155 labeled Player B. The abstractions represented by the two rows correspond to the sequence of URL requests that would result in a temporal sequence of portions of media content that contain player A and B, respectively.

It should be appreciated that using the schema, even though player A is moving through different camera fields of view, a viewer device does not need an updated version of manifest data 125 to request a temporal sequence that properly tracks player A.

The assignment of URLs for fragments in fragments 145 such that the indexing schema of manifest data 125 supports player specific live streams uses the information from positioning server 160 and camera server 195. By determining if the position of each player from positioning server 160 is within the positions covered by the field of view of a particular camera, as provided by camera server 195, media server 110 can associate a corresponding URL for a particular encoded fragment. The solid and dashed traces overlaid on the fragments 145 illustrate the association of URLs to encoded fragments represented by the abstraction of the stored fragments 155.

When viewer device 120a transmits a request to view a live stream of media content 105, media server 110 provides manifest data 125 to be used to request fragments from among stored fragments 155 for playback of the live stream. Manifest data 125 informs the viewer device 120a which player specific live streams are available. In certain implementations, a visual indicator can be displayed on viewer device 120a for the purposes of selecting an available player specific live stream.

Similarly, viewer device 120b uses the same manifest data 125 to request fragments for playback of the live stream corresponding to player B. In certain implementations, the manifest data is customized based on the characteristics of the requesting viewer device. For example, a viewer device corresponding to a large television may receive manifest data including playback options at UHD, whereas a viewer device corresponding to a small smartphone may receive manifest data excluding the UHD option. Aside from specifying a particular player, viewer devices 120a-b do not need to be modified to be able to receive personalized live streams that track specific players.

When manifest data 125 is provided, only fragment 1 of stored fragments 155 might be available for playback. The format for requests for fragments 2-6 is detailed in manifest data 125, but those fragments might not exist yet because they are expected to be generated in the future as the live stream of media content 105 progresses during the live event. Fragments corresponding to portions of the live event occurring in the future have yet to be encoded. Thus, the schema in the manifest data is capable of identifying both encoded and presently unencoded fragments.

In addition to facilitating the association of URLs to video fragments having tracked objects identified by a parameter in the URLs, the outputs of positioning server 160 can be separately processed to determine dynamic characteristics. Dynamic characteristics include characteristics of a particular player that can be updated based on the stream of positioning information. Examples include velocity, acceleration, orientation, distance traveled, and so forth. Where applicable, dynamic characteristics can be instantaneous, average, or peak values. In implementations where multiple instances of tag 180a are on a player, such as on each body limb, more granular characteristics such as body pose and gait analysis parameters such as stride and cadence can be determined. Dynamic characteristics can include biometric parameters, such as impact force to the body or helmet.

Metadata representing dynamic characteristics calculated by, for example, media server 110, can be embedded in the stored fragments 155, such as in unused bits, or separately provided to viewer devices 120a-b, such as through a separate URL. Viewer devices 120a-b can request specific dynamic characteristics out of a list of available dynamic characteristics identified in manifest data 125 or at a separate URL. In some implementations, the outputs of positioning server 160 are provided to viewer devices 120a-b to allow calculation of dynamic characteristics by the viewer devices 120a-b.

In FIG. 1, metadata 130a and 131a are an example of a descriptive dynamic characteristic of player A being provided to viewer device 120a. The descriptive category of dynamic characteristics refers to a parameter providing information on a current state related to a player. For example, at one time instant, metadata 130a indicates that player A has a velocity of 7 miles per hour. At a later time instant, metadata 131a indicates that player A has a velocity of 12 miles per hour. Descriptive characteristics can also include recognition of events involving player A, such as a fumble or an interception. Such descriptive characteristics can make the media content 105 more engaging by providing an early unofficial explanation of a live event without waiting for officiating personnel.

Metadata 130b and 131b are an example of a predictive dynamic characteristic for player B. The predictive category of dynamic characteristics refers to a prediction based on a current state of the player. For example, metadata 130b is a prediction based on the position, velocity, and acceleration of player B, relative to the opposing team players nearby, that player B has a 38% chance of completing a touchdown. As the distance between player B and the opposing team players increase, at a later time instant, metadata 131b indicates that player B's probability of completing a touchdown has increased to 68%.

The descriptive and predictive analytics information in metadata 130a-b and 131a-b can be used to enhance the user interface for viewer devices 120a-b. For example, the prediction of touchdown success or the velocity can be indicated using text or color-coding in a heads up display (HUD) overlay, scrolling ticker, or split screen. Further examples include through text-to-speech or other audio cues, through force feedback such as smartphone vibration intensity, embedding in closed captioning data, and so forth.

In addition to using dynamic characteristics to generate user interface enhancements displaying descriptive and predictive analytics, the dynamic characteristics may also be used to increase the interactivity of the live streams provided to viewer devices 120a-b.

For example, the user of viewer device 120a can engage with the NFL football live stream by wagering on various outcomes. In addition to being able to wager on uncertain outcomes such as a winning team, point spread, and so forth, the granular dynamic characteristics derived from the outputs of positioning server 160 enable wagering on a wide range of objective outcomes related to a particular player. For example, viewer device 120a may have a wagering stake based on whether player A is able to achieve a maximum running velocity of over a certain mile-per-hour, in light of player A's recent return from knee surgery. The display of the metadata describing velocity can be modified based on the wager, such as changing the numerical display from green to red when the velocity exceeds the wagered upon value. By identifying video fragments that follow player A and synchronizing them with metadata describing the velocity of player A, the architecture of FIG. 1 enables a user interface for viewer device 120a to concurrently display 1) a dynamic characteristic being wagered on, and 2) a live stream specific to the player that the dynamic characteristic being wagered on relates to. Such integration increases the level of engagement of the user of viewer device 120a with the media content 105.

In certain implementations, placing wagers and managing funds is performed on a separate device, application, or service. In other implementations, media server 110 interfaces to a wagering or fantasy sports service for the purposes of forwarding requests to place wagers from viewer device 120a, and to obtain information from the wagering server regarding profits and losses.

As another example, the user of viewer device 120b can interact with the NFL football live stream through gamification features. Specifically, before the whistle blows, a question can be displayed as illustrated on the screen of viewer device 120b that asks whether the next play will be a run, pass, or punt. Once the next play has been executed and the position information from positioning server 160 has been processed to determine the correct answer, points associated with viewer device 120b can be accumulated based on whether the response was correct, and how quickly the response was provided. In addition to increasing engagement with the media content 105, interactivity across different viewers can be increased with social networking features, such as point rankings and messaging interfaces.

As with the wagering features, the architecture illustrated in FIG. 1 enables adding the interactive characteristics of video games to the passive nature of spectator sports. The present disclosure allows these enhancements to be achieved in the user interface of viewer device 120b without the need to modify the basic operation of the live streaming content delivery network, the manifest schema, or the viewer device itself.

Figure 2:
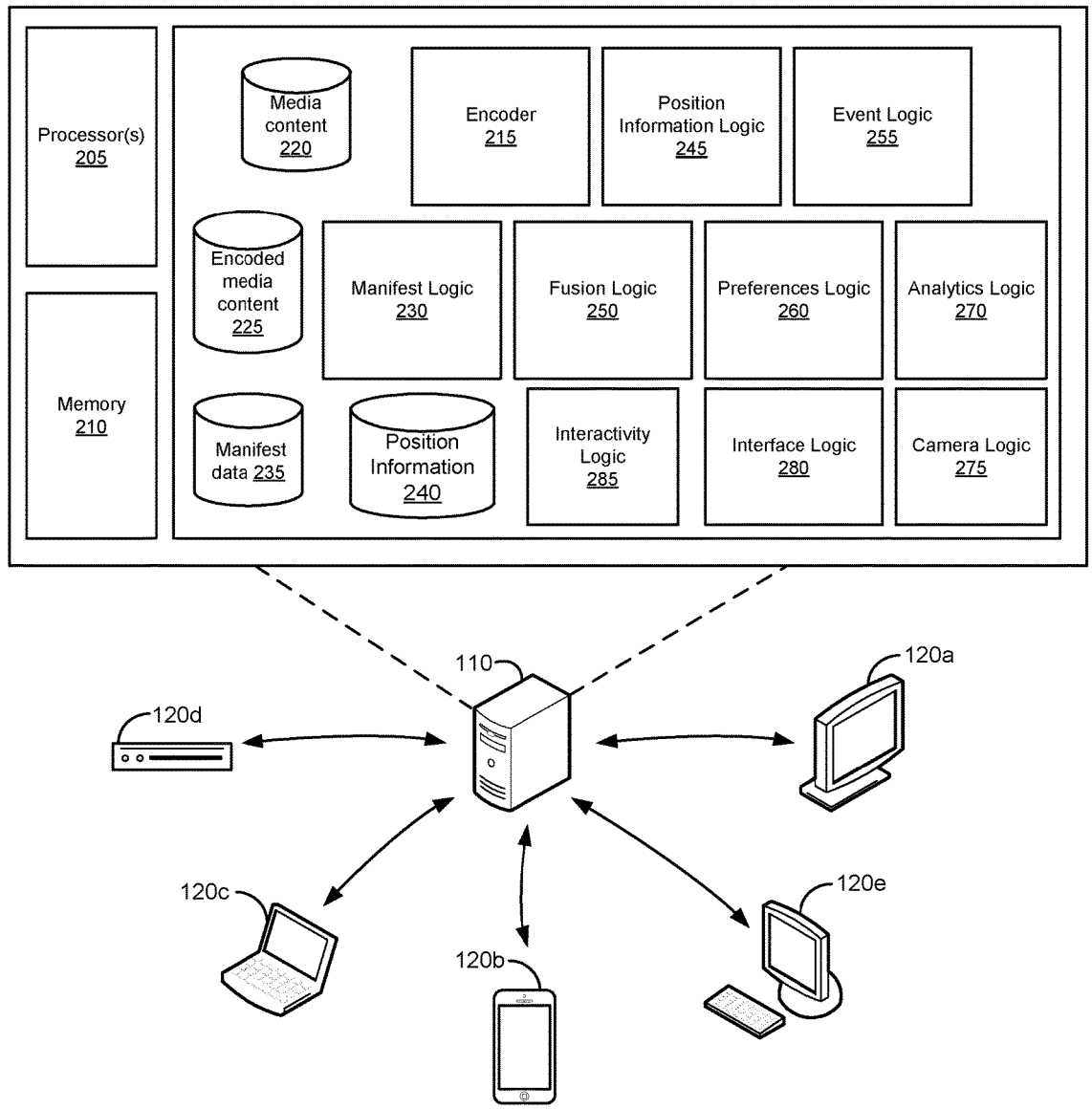
FIG. 2 illustrates an example of a computing environment providing personalized live streaming media content.

FIG. 2 illustrates an example of a computing environment configured to provide personalized live streaming media content. The computing environment of FIG. 2 includes media server 110 that provides manifest data to viewer devices 120a-e so that they can request and receive fragments of personalized live streaming media content. Viewer devices 120a-e can include smartphones, televisions, laptop computers, desktop computers, set-top boxes, video game consoles, tablets, wearable devices, virtual reality headsets, and other electronic devices.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 may be part of a content delivery system that conforms to any of a wide variety of architectures. The functionality and components of media server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality can be implemented in an edge server or content server of a CDN, a server of an ISP, etc.

In some implementations, media server 110 can include one service using one or more servers to provide manifest data to viewer devices 120a-e and they may request fragments from another service using one or more of the same or other servers of media server 110, such as an edge server of a CDN, based on the manifest data provided by the first service.

In FIG. 2, viewer devices 120a-e include various types of logic used to implement a video player to provide playback of media content. Viewer devices 120a-e can include one or more processors, memory, a display, and other hardware components or circuits to request manifest data and fragments of media content to store in a playback buffer. For example, viewer devices 120*a-e* can include processors that can execute stored instructions in memory to implement parts of the techniques disclosed herein, such as making fragment requests based on the manifest data, or extracting metadata embedded in a fragment.

Media server 110 includes one or more processors 205, memory 210, and other hardware components or circuits to provide manifest data to viewer device 120*a-e* so that they can request fragments for playback of a personalized live stream. Processors 205 and memory 210 can receive video and audio data corresponding to a live event in media content 220 and implement encoder 215 to generate fragments at various quality levels. In some implementations, encoding can occur remotely from media server 110, such as at fragment server 140.

Position information logic 245 interprets the position data stored in position information store 240. Position information store 240 includes the position information for a particular tag being tracked, which may correspond to a player, player limb (e.g., player's knee), coach, ball, and so forth. Position information store 240 also includes the position of cameras and other sources of media content, such as microphones. The spatial coverage for a particular camera can be provided from camera logic 275, which communicates with camera server 195, or can be derived by position information logic 245 based on the position of a camera and the lens characteristics for the camera, such as a focal length, image sensor size, aperture width, and so forth. In some implementations, the spatial coverage can be determined based on recognition of identifiable features in the video feed of a camera, for example, the separation distance between yard line markers. Position information logic 245 determines if for a time interval corresponding to a particular media fragment, a particular player is within the coverage of a particular media content source. Position information logic 245 can interface with positioning systems with transmitters located on either the players or infrastructure deployed throughout the stadium.

Camera logic 275 provides information on the spatial coverage for a particular camera, such as a bounding polygon, a list of coordinates included in the field of view, or camera parameters for calculating the spatial coordinates included in the field of view. Camera logic 275 also prioritizes portions of media content that include a particular player. For example, camera logic 275 may assign a portion of media content displaying the front view of a particular player a higher priority than a portion of media content displaying the back of the particular player. Manifest logic 230 can use the portion of media content having a higher priority when determining which of the two portions of the media content should be associated with a URL specifying the particular player. It should be appreciated that for the same portion of media content, the priority level may differ based on different players, such as when two players are facing opposite directions. Camera logic 275 can also assign priorities based on how close a player is to the center of the field of view, the size of the player in the field of view, the elevation angle, the presence of partial occlusion, and so forth.

Fusion logic 250 can modify the data in position information store 240 representing a position of a tag based on integrating position estimates from different modalities of sensing. For example, fusion logic 250 interfaces to a first positioning system using RF, a second using optical, and a third using inertial measurement. Fusion logic 250 can detect when the accuracy of certain positioning systems fall below a quality threshold, and either discard or reduce the confidence associated with the particular modality of sensing. For example, when occlusion and RF shadowing is detected, the outputs of optical and RF sensors are ignored, and only the inertial data is used. Alternatively, the RF, optical, and inertial systems can each output an occupancy grid. An occupancy grid separates a spatial region into several grid elements, and associates with every grid element a probability value that a particular tag occupies the grid element. The grid element corresponding to the highest probability is the estimate of the position of the player. Based on the quality of the position data as determined by detecting signal interference or occlusion events, the probability values can be weighted or discounted prior to combining to obtain a fused position estimate. By using multiple modes of sensing, fusion logic 250 facilitates increasing accuracy and reliability of position estimates, which can help resolve occlusion artifacts.

Event logic 255 derives context specific (soccer, football, volleyball, etc.) event information from position information store 240. As an example, media content representing an NFL game is conventionally provided to a viewer with a latency of more than about 15 seconds. A latency in this range is too high for interfacing media content for an NFL game with the interactivity of certain applications, such as real-time fantasy sports and online wagering, due in part to the risk of arbitrage by spectators attending the NFL game in person. Part of this latency is attributable to the involvement of human intervention to view and interpret the output of the multiple cameras filming the football game to create context specific tags that correspond to events, such as a pass, an interception or a touchdown. The human intervention can take the form of one individual watching the NFL game and pressing buttons on a console corresponding to an event like "snap" or "pass" after witnessing the event, and a second individual with a similar console performing the same interpretations for error checking purposes. More complex sequences of events, which often correspond to segments of the game that are of higher interest to viewers, often involve even higher latency values.

Technologies for facilitating this event recognition process include obtaining position information of players instrumented with radio frequency identification (RFID) tags using ultra-wideband signals in the 6 GHz range, and/or machine vision, such as gesture or body limb position estimation, or performing optical character recognition on player uniform numbers. Examples of positioning systems using RFID technology include the Isolynx system, or the Zebra Sports Solutions Player Tracking System by Zebra, which is described in ZEBRA SPORTS SOLUTIONS DATA SHEETS, which is incorporated in its entirety herein by reference. The RFID positioning system by Zebra has an accuracy of ±1 foot without averaging, and ±4 inches with averaging.

Developments in positioning technology are further increasing position accuracy. As one example, research in V-band (approximately 53-67 GHz) RF components are opening new possibilities for a next generation of RFID sensors that provide greater accuracy to facilitate automatic event recognition. Specifically, conventional RFID positioning systems that use ultra-wideband signals in the FCC unlicensed 6 GHz range, such as the Zebra system, are limited by FCC regulations to a power density of −40 dBm/MHz. Transmitters operating in the FCC unlicensed V-band are limited by FCC regulations to a power density of 0 dBm/MHz, which is on the order of $10^4$, or 10,000 times more RF power. This increase in RF power reduces the effects of RF shadowing. RF shadowing is analogous to occlusion in the optical domain. For example, in optical tracking systems, occlusion occurs when the tracked object is obscured by an object interposed between the tracked object and the camera. Occlusion reduces accuracy of optical tracking systems. Similarly, RF shadowing occurs when an attenuator is interposed between an antenna on a tracked object and a receiver antenna, and the attenuator weakens the signal to the extent that the receiver antenna can no longer detect the signals transmitted by the antenna on the tracked object. Higher RF power reduces the rate at which RF shadowing occurs, and in turn increases accuracy. The FCC allows higher RF power at the V-band partly because of the unique characteristic that V-band RF energy is strongly absorbed by atmospheric oxygen, thereby reducing the distance that V-band RF energy travels before becoming attenuated to a level that minimizes the risk of interference with other communication systems.

Additionally, by operating in a frequency range that is an order of magnitude higher than conventional 6 GHz RF positioning systems, the corresponding operating wavelength has been decreased by an order of magnitude, from 50 mm to 5 mm. As a result, antennas having the same gain as in conventional RF positioning systems can be an order of magnitude smaller, thereby allowing phased antenna arrays to be practically implemented in the same volume as conventional RFID tags. The benefits of phased antenna arrays are greater spatial resolution. As a result, in addition to increasing the X-Y plane accuracy to facilitate resolving instances of one-on-one interleaving, such as when a wide receiver and defender cross trajectories during a play, RF positioning system using phased antenna arrays can introduce previously unavailable z-axis position information, which is useful when automating determination of player positions in scrums.

It should be appreciated that positioning systems are not limited to the 6 GHz and V-band RF positioning systems as described herein. An example of an alternative includes high-resolution cameras detecting indicia (e.g., quantum dots) on player uniforms. Another example includes inertial measurement sensors and algorithms, such as those by Navisens. It should be appreciated that positioning estimates from different sensing modalities, such as RF, optical, and inertial, can be used in parallel to increase reliability and accuracy. In some implementations, cameras used for position estimates may be different from the cameras used for generating the media content 105. In other implementations, position information can be derived using the cameras generating the media content 105 corresponding to a live event. For example, in implementations using optical character recognition of indicia on player uniforms, the outputs of camera 165*a-c* in FIG. 1 can be used as inputs to the optical character recognition process.

Event logic 255 delimits events, such as the beginning and end of play, which can be used to synchronize the start and stop of highlight reels and to determine the appropriate timing to display interactive features, such as gamification features. Event logic 255 also identifies event type, such as a fumble, interception, or touchdown. By processing position information for multiple players, event logic 255 may also identify team formation/plays. Event logic 255 can also process outputs of video or audio feeds including officiating personnel to perform optical gesture or speech recognition, respectively, to identify events. The outputs of event logic 255 can be used to determine the occurrence or absence of events that are the subject of wagering, or provided to user interface logic 280 as unofficial assessments to display prior to decisions by officiating personnel. Event logic 255 may also interface with fantasy sports services to provide real-time updates.

Preferences logic 260 identifies the player, coach, ball, etc. to focus on in the personalized live stream provided to a viewer device. In certain instances, preferences logic 260 identifies the player of interest, such as by detecting a gesture on a touchscreen selecting a particular player, interfacing to a voice command through the Alexa voice assistance infrastructure, or through a menu selection. In instances where a selection is not indicated, preferences logic 260 can rely on inferential logic to determine a player of interest. The inferential logic can incorporate various sources of information to determine viewer preferences, such as a fantasy sports profile, social networking profile, media content viewing history, shopping history, user preferences, Web search history, and so forth. Based on a selection indicated by the viewer device or inferential logic, preferences logic 260 identifies the player specific stream to provide to the viewer device.

Analytics logic 270 calculates contextual information, such as historical analytics (e.g., rate of pass completion in the previous season), descriptive analytics (e.g., current running speed), and predictive analytics (e.g., likelihood of pass completion). Analytics logic 270 calculates the dynamic characteristics for the historical, descriptive, and predictive analytics based on position information store 240. The dynamic characteristics contemplated include kinematic (e.g., velocity, acceleration, etc.) and biomechanical (e.g., orientation, pose, gait, etc.) parameters. In certain implementations, the dynamic characteristics can be augmented with biometric (e.g., respiration, pulmonary rate, perspiration, caloric expenditure, etc.) and medical (electromyography, electroencephalography, electrocardiography, etc.) parameters to generate a "health bar" indicative of the overall physiological state of an athlete. Such health information can be used for preventative purposes, for developing player specific training regimens, and also for user interface enhancements, such as a "fatigue counter." Analytics logic 270 can also provide quantitative baselines for evaluating the accuracy of officiating decisions, such as where a player's knee touched the ground, how far a football traveled on a particular play, or whether the end zone was crossed. Analytics logic 270 can also perform calculations oriented to the needs of coaching and team staff that may be observing player specific live streams, such as evaluating movement patterns, team formations, player position "heat maps," player separation distances during passes, and so forth.

Historical analytics can provide flexible time spans, such as per quarter, per game, per season, per year, or across an entire career, to track the development of player characteristics over time. Descriptive analytics provide real time statistics and event recognition information, which can provide experienced viewers a more information rich perspective of the event. Descriptive analytics can also provide novice viewers an annotated framework that can act as a tutorial for understanding the rules of the game, thereby attracting new audiences. Predictive analytics support interactive features such as wagering and/or gamification, through either collaboration or competition.

Interface logic 280 generates the interface enhancements based on the outputs of analytics logic 270 and event logic 255. Interface enhancements include text or graphical overlays, highlights, infographics, and so forth. Interface enhancements can be tailored to the experience level of the viewer, such as an overlay providing a tutorial to explain to beginners how the game works. Interface enhancements can be oriented towards accessibility, such as smart zooming combined with text-to-speech based on event recognition to increase engagement for visually impaired viewers, and/or for viewers using devices with limited screen size. For example, smart zooming can be achieved by using the tracked position of the player of interest to crop out portions of the field of view that are of less visual interest. In certain implementations, smart zooming features can be combined with deployment of cameras with very high resolution.

It should be appreciated that interface logic 280 can enhance the user interface by offering visual aids for a variety of possible in-game event (touchdown, interception, pass completion, etc.) that can be overlaid on the live stream. Examples include highlighting the player with the ball as determined by combining position information for a player and position information for the ball, highlighting which players are open for a pass, highlighting the end zone, color coding based on team possession, or indicating when possession is undetermined. Another example is detecting when a quarterback is in the pocket, and based on detecting the positions of the opposing teams players near the pocket, highlighting the pocket area green or red based on the likelihood that the quarterback will be sacked. Visual aids may be unofficial for the purposes of the governing body of the sport, like the yellow line depicting the first down line shown in certain NFL television broadcasts, but can still be provided to enhance the viewing experience.

Overlays can be updated in a continuous fashion. For example, a touchdown success meter in the form of a heads up display can be displayed in the upper left corner. The value can be constantly refreshed based on which players are coming on the field, the formation detected during lineup, the first play after the snap, and player movement as the play progresses. The augmented reality interfaces described herein increase viewer engagement and comprehension. For example, there can be less of a delay compared to waiting for a call from a referee, or the need to refer to a second screen, which may cause the viewer to miss an important event.

In some implementations, interface logic 280 outputs instructions in a graphics programming language that are provided to a viewer device by embedding as metadata in video fragments, or through a separate channel. The viewer device executes the graphics programming instructions and overlays the interface enhancements onto the personalized media stream. In other implementations, a video fragment superimposing the interface enhancement is generated, and the video fragment with the superimposed interface is provided in place of the unmodified video fragment when requested. In such scenarios, viewer devices with less sophisticated graphics rendering abilities can still receive personalized live streams with advanced user interface enhancements.

In certain implementations, interface logic 280 can provide a multiple live stream interface for when media server 110 receives requests identifying multiple objects of interest, or multiple views of an object of interest. As one example, a split screen layout can display multiple live streams, each one corresponding to a different player of interest, or different views of the same player. It should be appreciated that each live stream can be displayed using different image frame sizes, such as, for example, a first live stream displayed in the left half of a display, and multiple smaller live streams displayed in the right half of a display. Furthermore, certain live streams can be overlaid above other live streams, such as a picture-in-picture (PiP) layout.

In various implementations, interface logic 280 transcodes the multiple live streams into a single live stream for which a viewer device can request fragments. In other implementations, the multiple live streams are provided to a viewer device as separate sequences of fragments, and interface logic 280 provides graphics rendering instructions to the viewer device to control the relative positions, sizes, and metadata overlays on each separate live stream.

It should be appreciated that the multiple screen interface as described herein can be used for instances where media server 110 receives requests indicating a live stream corresponding to fields of view selected by a media provider, such as a television broadcaster, together with one or more live streams tracking an object of interest indicated by the viewer device. It should further be appreciated that each live stream in a multiple live stream interface can correspond to different events, such as, for example, two different football games, or as another example, a basketball game and a football game that are being broadcast live simultaneously. Furthermore, a multiple live stream interface can automatically be provided, even in the absence of requests indicating corresponding to multiple live streams, when event logic 255 detects an event where multiple fields of view of the same object of interest may increase engagement with the media content. For example, during a free-throw in the final moments of a basketball game that is tied, interface logic 280 can automatically provide multiple live streams of the player taking the free-throw.

It should be appreciated that analytics-based interface enhancements as described herein can be provided simultaneously with multiple live stream interfaces. For instance, returning to the previous example, predictive analytics indicating the percentage probability that the player will successfully make a free-throw based on the success rate of the last 10 free throws, together with historical analytics indicating free-throw success rate over the entire season and over the entire career, can be overlaid on one or several live streams in the multiple live stream interface.

Interactivity logic 285 provides an interface to services relating to interactive features such as fantasy sports, wagering, and gaming. By interfacing to fantasy sports services, interactivity logic 285 can retrieve a particular fantasy sports profile associated with a viewer device. The players in the fantasy sports profile can be supplied to the preferences logic 260 to infer particular players that may be of interest, without waiting for an indication of a selection from a viewer device. Furthermore, based on a fantasy sports profile, the personalized live stream can be configured to jump between different players across different games based on real-time events that affect the scoring system used by the fantasy sport service. In some implementations, interactivity logic 285 can communicate with a fantasy sports service to allow real-time dashboard updates based on in game events. In certain implementations, interactivity logic 285 enables an active application in a viewer device that is not a viewer application for streaming a football game to still receive real-time updates based on events relevant to fantasy sports scoring.

Interactivity logic 285 also provides features relating to gamification. Breakages in play provide opportunities by the media server to insert trivia questions, solicit coaching strategy, or indicate how the predicted outcome of a user selected formation or play may have differed from the actual outcome. Such interactions can be further integrated with scoring systems tied to merchandise or other rewards based on speed or accuracy.

Interactivity logic 285 provides a platform similar to Twitch to create a sense of community for viewers of live events such as athletic events, and includes features relating to audio or text messaging between viewers of the same or different streams, taunting, liking, bookmarking, commenting, podcasting, and interfacing with social networks.

Manifest logic 230 generates manifest data 125 and stores manifest data 125 in manifest data store 235. Manifest logic 230 uses the interpretations of position information store 240 provided by position information logic 245, and the priority levels for portions of media content as provided by camera logic 275. For example, manifest logic 230 can determine that position information logic 245 is indicating that a particular video fragment, or portion of media content, contains a particular player of interest. When manifest logic 230 generates manifest data 125, manifest logic 230 verifies that the network locations for the video fragments containing the player of interest are consistent with the schema used in manifest data 125.

Manifest logic 230 determines the network addresses to associate with the fragments stored at the media server or distributed to a content delivery network. The association is such that the schema used by the manifest data, such as an incrementing index, correctly provides a temporal sequence of video fragments that tracks a specific player. The association can be established by storing the video fragments at the network locations corresponding to the URLs indicated by the schema in the manifest data to be generated. In other implementations, the association can be established using URL redirection data, which remaps certain URLs based on an indication by the outputs of positioning information logic 245. In such implementations, the URL requests that are generated based on incrementing an index act as addresses that are mapped to a new URL having a particular encoded fragment representing a player identified in the URL address prior to mapping.

Manifest logic 230 provides manifest data to a viewer device upon request for playback. The manifest data may identify an edge server in a CDN that is configured to receive requests for fragments, and provide the corresponding fragments to the viewer device. In some implementations, manifest data indicating the network address to request the subsequent fragment for a live stream with a particular player is embedded as a mini manifest within the most recent video fragment being provided. In other implementations, a separate communication channel can provide a constantly updated manifest file.

As will be understood, processors 205 execute stored instructions in memory 210 to implement the logic functions and other techniques disclosed herein.

Figure 3:
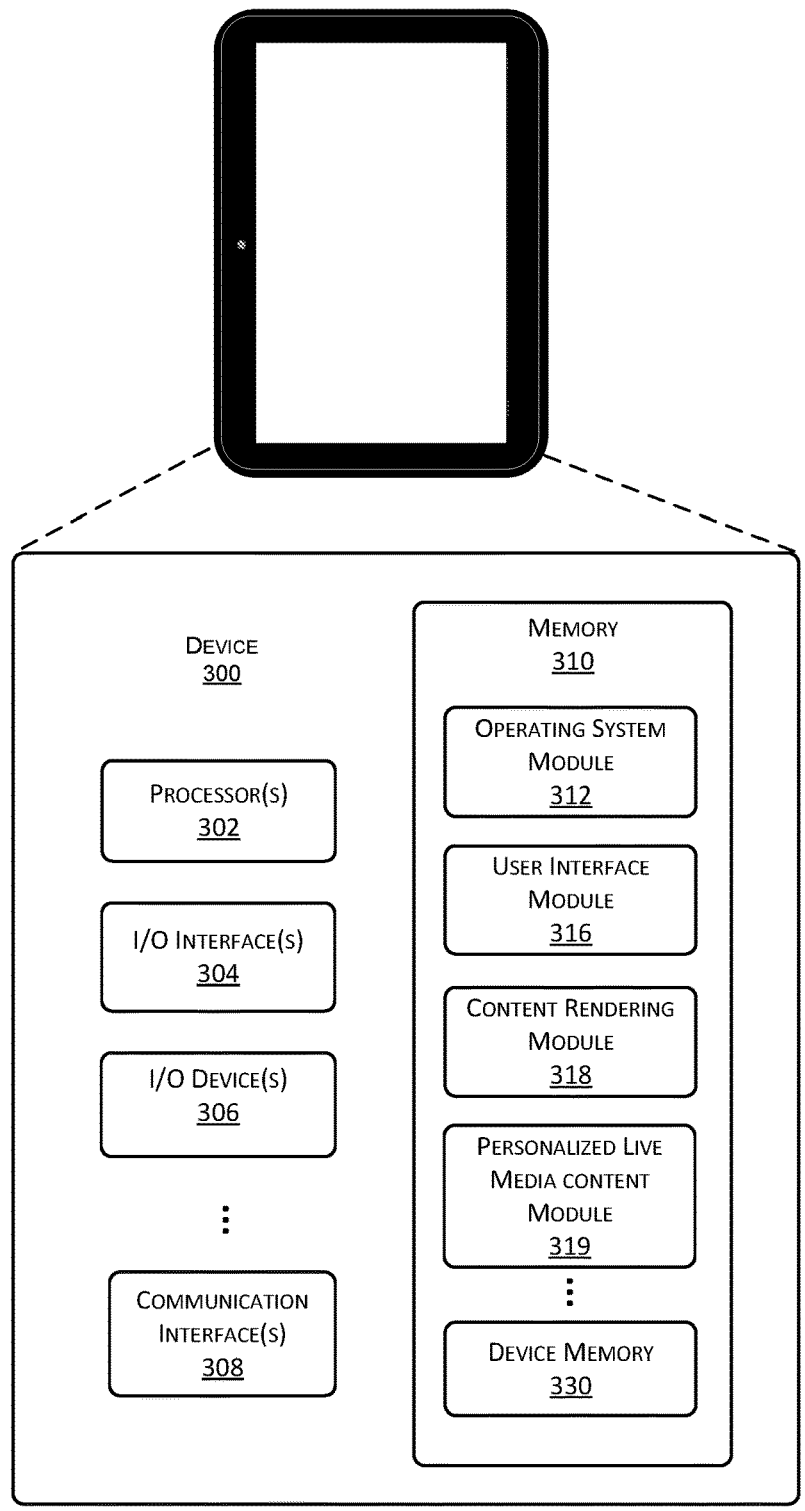
FIG. 3 illustrates an example of a viewer device configured to consume personalized live streaming media content.

A block diagram of an example of a client device 300 suitable for use with various implementations is shown in FIG. 3. Device 300 includes one or more single or multi-core processors 302 configured to execute stored instructions (e.g., in device memory 330). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. I/O device(s) 306 may include one or more displays, one or more haptic generators, a touch sensor array, one or more accelerometers, one or more image capture systems, one or more motion sensors, one or more orientation sensors, microphones, speakers, and so forth.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a Wi-Fi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 330 to store a wide variety of instructions and information using any of a variety of formats including, for example, flat files, databases, linked lists, trees, or other data structures. In some implementations, a portion of device memory 330 may be distributed across one or more other devices including servers, network attached storage devices, and so forth.

At least some of the logic or computer program instructions used to support personalized live streaming media content as described herein may be resident on client device 300. For example, at least some of this functionality may be implemented as part of the code of a media player operating on device 300. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used. The scope of this disclosure should therefore not be limited by reference to device-specific details.

Some of the implementations enabled by the present disclosure contemplate logic resident on the client devices consuming personalized live media content; such logic being configured, for example, to extract information, make decisions, and/or present information in conjunction with manifest data (e.g., determining the correct format for a fragment request), or metadata attached or embedded within a received fragment. The logic might be part of an existing algorithm or module on the client device or implemented to work in conjunction with such an algorithm or module. The logic might be implemented, for example, in a media player on the client device or as a separate application or module resident on the client device.

User interface module 316 includes logic for displaying the user interface enhancements. For client devices that are limited in computational or graphical resources, media server 110 may provide video fragments that have been re-encoded to integrate the user interface enhancements, such as the descriptive or predictive analytics. For client devices with graphics capabilities such as execution of graphics programming language instructions, user interface module 316 interfaces with content rendering module 318 to handle the rendering of the user interface enhancements on the client device, and for overlaying them on the video fragments in the personalized live media stream.

Personalized live media content module 319 includes logic to perform extraction and processing of the available player specific streams identified in manifest data 125. The client device can present the extracted options on a menu for selection, or interpret a gesture such as a tap on a particular player as a request for a player specific live stream.

As another example, such logic might perform extraction and processing of metadata embedded within a received fragment. Such metadata can include information on the dynamic characteristics that can be requested from the media server 110, and once requested, extraction of the dynamic characteristic itself.

According to some implementations that use variable bit rate encoding, such metadata might include file size for the next available fragment, thereby allowing optimization of network resource usage. In other implementations, the metadata can include manifest update information, such as a new player or object on the field that can be tracked. Embedded metadata can also include data related to the gamification, fantasy sports, and wagering features described herein, or identify a separate channel to obtain such data.

In implementations where sequences of video fragments for a particular player are not stored using a schema that corresponds to incrementing an index value, a mini manifest embedded in each video fragment informs the viewer device of the correct URL to request the next player specific video fragment.

Figure 4:
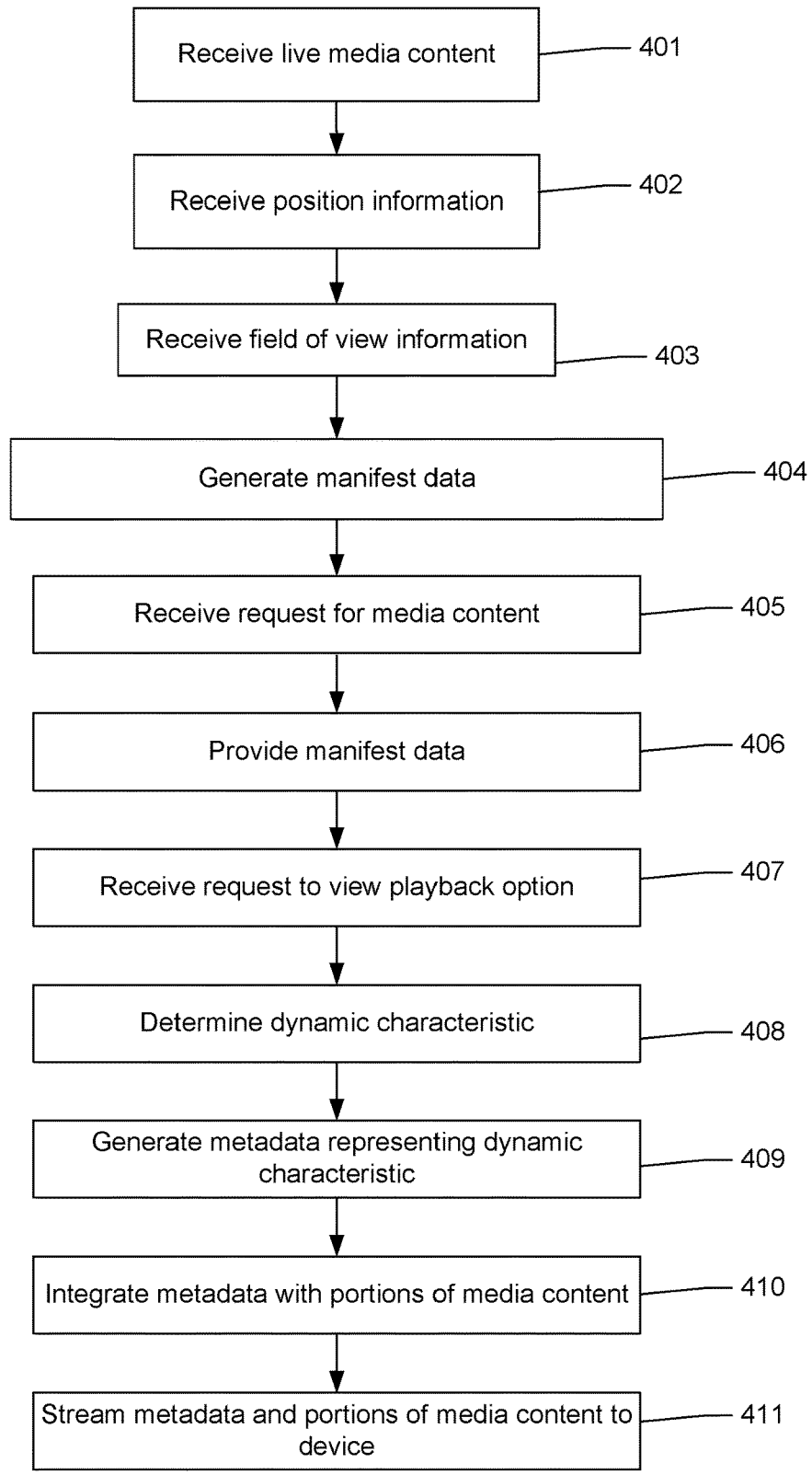
FIG. 4 is a flowchart illustrating an example of server operations for personalized live streaming media content.

FIG. 4 is a flowchart illustrating server operations for personalized live streaming media content. One or more servers receive media content representing a live event, for example, an athletic event. The media content corresponds to the output of multiple cameras. Each portion of the media content may correspond to a camera having a field of view relative to a stadium where the athletic event is taking place. In certain implementations, a portion of the media content corresponds to an encoded video fragment. For example, as live media content is recorded, a server receives the media content and generates fragments corresponding to segments of the live media content (401).

The athletic event has participants, for example, players, coaches, team staff, mascots, select fans, officiating personnel, and so forth. A server receives position information for the participants (402), which may include a position for a player on a field of play for the athletic event, in contrast to a player who is resting on the bench.

A server also receives field of view information (403) for each camera that is recording the live event. The cameras may have static or dynamic fields of view, and may be installed on stationary mounts throughout a stadium, or may be a body worn camera mounted on a participant of the live event. The field of view information may be represented as a 2-dimensional or 3-dimensional boundary geometry for the view of each camera.

A server generates manifest data representing playback options of the media content (404). The manifest data includes a playback option representing a live stream corresponding to a temporal sequence of portions of the media content that include a particular player. In some implementations, a portion of the media content is determined to include a player when the position information for the player corresponds to a position identified by a boundary geometry used to represent a field of view of a camera. For example, a field of view may be represented by a boundary geometry stored as a vector of two dimensional coordinates: (0, 0), (0, 10), (10, 10), and (10, 0). A player with a two dimensional position coordinate of (5, 5) corresponds to a position included in the boundary geometry, while a player with a coordinate of (15, 15) is not included in the boundary geometry. In certain implementations, the boundary geometry may be represented by a center point and a radius, in contrast to, for example, specifying the vertices of a polygon. The temporal sequence can include portions of the media content from different cameras. For example, the beginning of the temporal sequence can include video fragments that are provided by the camera with the boundary geometry as described above. As the particular player runs with the football, and moves to a coordinate of (15, 15), a second camera with a boundary geometry of (10, 10), (10, 20), (20, 20), and (20, 10) provides the video fragments for the subsequent part of the temporal sequence.

In some implementations, the temporal sequence of video fragments that depicts a player moving from a coordinate of (5, 5) to a coordinate of (15, 15) is generated through the process of responding to a sequence of fragment requests from a device that specifies the particular player. In other implementations, the same temporal sequence can be generated independent of fragment requests. For example, a particular player may be a superstar athlete, and therefore have a high probability of being a player of interest for numerous viewers. In such instances, the temporal sequence following the superstar athlete may be generated as one of a group of pre-defined custom streams that a device can select from.

Continuing with FIG. 4, a server receives a request to view the media content from a device (405). The request may include additional information, for example, device characteristics, subscription privileges, and so forth.

A server then provides manifest data for playback of the media content to the device requesting the media content (406). In some implementations, the manifest may be a static manifest that is provided to a variety of devices requesting the same media content. In other implementations, the manifest may be a dynamic manifest that is customized based on the characteristics of the requesting device. The manifest data includes playback options for the media content.

A server receives a request from the device to view a playback option (407). The request may identify a variety of attributes for the portions of the media content to playback on the device, for example, a quality based on a bit rate level, and a particular player. The request can also identify a dynamic characteristic of the identified player, such as a running speed.

In some implementations, the server receiving a request from the device to view a playback option is a media server. The media server calculates the dynamic characteristic using the position information for the player identified in the request (408). For example, the media server can calculate running speed based on two samples of position information by dividing the distance traveled by the elapsed time between the two samples. It should be appreciated that calculation of dynamic characteristics may include samples of different sizes, and may include a variety of mathematical functions, including but not limited to arithmetic operations, filtering, calculating derivatives, calculating integrals, extrapolating, interpolating, interfacing to neural network algorithms or machine learning algorithms, and so forth. The media server generates metadata representing the dynamic characteristic (409). The metadata can be the value of the dynamic characteristic itself, a binary indicator of the dynamic characteristic relative to a threshold (e.g., true if greater than a wagered on value), a color code (e.g., the higher the running speed, the redder the hue of a halo), and so forth. The media server integrates the metadata with the portions of the media content (410). For example, the media server can embed the metadata in, for example, an H.264 or MPEG-4 video fragment. It should be appreciated that a wide variety of codecs can be used with the techniques disclosed. The media server streams the metadata and the portions of the media content having the identified player to the device (411). For example, the media server can use HTTP Live Streaming (HLS) to provide an H.264 video fragment with a running speed embedded in the "SEI" user data field. It should be appreciated that a wide variety of media streaming communication protocols can be used with the techniques disclosed.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    receiving media content representing a live event having a plurality of participants associated therewith, the media content including a plurality of portions of the media content, each portion of the media content corresponding to one of a plurality of cameras having different fields of view relative to the live event;
    receiving position information for a subset of the plurality of participants, the position information representing a position for each participant in the subset of the plurality of participants relative to a field of play associated with the live event;
    receiving a first request to view the media content from a first device, the first request identifying a first participant of the subset of the plurality of participants;
    streaming to the first device a first temporal sequence of first portions of the media content from among the plurality of portions of the media content based on the position information for the first participant, the first portions of the media content being selected such that the position information for the first participant is correlated with the fields of view corresponding to the first portions of the media content;
    receiving a second request to view the media content from a second device, the second request identifying a second participant of the plurality of participants;
    determining that position information for the second participant is not available; and
    streaming to the second device a subset of the first temporal sequence, the subset of the first temporal sequence corresponding to a subset of the first portions of the media content, based on determining that a probability that the second participant is visible in the subset of the first portions of the media content exceeds a threshold.

2. The computer implemented method of claim 1, further comprising:
    receiving a third request to view the media content, the third request identifying a third participant of the plurality of participants;
    generating a third temporal sequence of third portions of the media content from among the plurality of portions of the media content based on the position information for the third participant, the third portions of the media content being selected such that the position information for the third participant is correlated with the fields of view corresponding to the third portions of the media content;
    determining a third dynamic characteristic for the third participant using the position information for the third participant;
    generating third metadata representing the third dynamic characteristic;
    integrating the third metadata with one or more of the third portions of the media content;
    streaming the third metadata and the third temporal sequence of the third portions of the media content.

3. The computer implemented method of claim 1, further comprising:
    receiving a third request to view the media content, the third request identifying a third participant of the plurality of participants;
    determining that the position information for the third participant is correlated with the position information for the first participant;
    determining a third dynamic characteristic for the third participant using the position information for the third participant;
    generating third metadata representing the third dynamic characteristic;
    integrating the third metadata with one or more of the first portions of the media content;
    streaming the third metadata and the first temporal sequence of the first portions of the media content.

4. The computer implemented method of claim 1, further comprising:
    receiving a third request to view the media content, the third request identifying the first participant of the plurality of participants;
    determining a third dynamic characteristic for the first participant using the position information for the first participant;
    generating third metadata representing the third dynamic characteristic;
    integrating the third metadata with one or more of the first portions of the media content;

streaming the third metadata and the first temporal sequence of the first portions of the media content.

5. The computer implemented method of claim 1, wherein identifying a first participant of the plurality of participants is based in part on at least one of a shopping history, a viewing history, one or more preferences, or a fantasy sports profile corresponding to the first device.

6. The computer implemented method of claim 1, wherein the position information for the first participant is determined using both:
   1) one or more radio-frequency signals transmitted from a transmitter on the first participant, and 2) optical character recognition of a uniform number on the first participant.

7. The computer implemented method of claim 1, wherein determining that the position information for the first participant is correlated with the fields of view corresponding to the first portions of the media content includes:
   partitioning the field of play into a plurality of grid positions;
   determining for each grid position in the plurality of grid positions a probability that the first participant occupies the respective grid position;
   determining that each field of view in the fields of view in the first portions of the media content includes the grid position in the plurality of grid positions with a highest probability that the first participant occupies the respective grid position.

8. The computer implemented method of claim 1, further comprising:
   determining a first dynamic characteristic for the first participant using the position information for the first participant;
   generating first metadata representing the first dynamic characteristic; and
   integrating the first metadata with one or more of the first portions of the media content, wherein the first metadata represent one or more of an accuracy of an officiating event, or a likelihood of success of a particular play.

9. A system, comprising one or more computing devices configured to:
   receive media content representing a live event having a plurality of objects of interest associated therewith, the media content including a plurality of portions of the media content, each portion of the media content corresponding to one of a plurality of cameras having different fields of view relative to the live event;
   receiving position information for a subset of the plurality of objects of interest, the position information representing a position for each object of interest in the subset of the plurality of objects of interest relative to a field of play associated with the live event;
   receiving a first request to view the media content from a first device, the first request identifying a first object of interest of the subset of the plurality of objects of interest;
   stream to the first device a first temporal sequence of first portions of the media content from among the plurality of portions of the media content based on the position information for the first object of interest, the first portions of the media content being selected such that the position information for the first object of interest is correlated with the fields of view corresponding to the first portions of the media content;
   receive a second request to view the media content from a second device, the second request identifying a second object of interest of the plurality of objects of interest;
   determine that position information for the second participant is not available; and
   stream to the second device a subset of the first temporal sequence, the subset of the first temporal sequence corresponding to a subset of the first portions of the media content, based on determining that a probability that the second object of interest is visible in the subset of the first portions of the media content exceeds a threshold.

10. The system of claim 9, wherein the one or more computing devices are further configured to:
   receive a third request to view the media content, the third request identifying a third object of interest of the plurality of objects of interest;
   generate a third temporal sequence of third portions of the media content from among the plurality of portions of the media content based on the position information for the third object of interest, the third portions of the media content being selected such that the position information for the third object of interest is correlated with the fields of view corresponding to the third portions of the media content;
   determine a third dynamic characteristic for the third object of interest using the position information for the third object of interest;
   generate third metadata representing the third dynamic characteristic;
   integrate the third metadata with one or more of the third portions of the media content;
   stream the third metadata and the third temporal sequence of the third portions of the media content.

11. The system of claim 9, wherein the one or more computing devices are further configured to:
   receive a third request to view the media content, the third request identifying a third object of interest of the plurality of objects of interest;
   determine that the position information for the third object of interest is correlated with the position information for the first object of interest;
   determine a third dynamic characteristic for the third object of interest using the position information for the third object of interest;
   generate third metadata representing the third dynamic characteristic;
   integrate the third metadata with one or more of the first portions of the media content;
   stream the third metadata and the first temporal sequence of the first portions of the media content.

12. The system of claim 9, wherein the one or more computing devices are further configured to:
   receive a third request to view the media content, the third request identifying the first object of interest of the plurality of objects of interest;
   determine a third dynamic characteristic for the first object of interest using the position information for the first object of interest;
   generate third metadata representing the third dynamic characteristic;
   integrate the third metadata with one or more of the first portions of the media content;
   stream the third metadata and the first temporal sequence of the first portions of the media content.

13. The system of claim 9, wherein identifying a first object of interest of the plurality of objects of interest is based in part on at least one of a shopping history, a viewing history, one or more preferences, or a fantasy sports profile corresponding to the first device.

14. The system of claim 9, wherein the position information for the first object of interest is determined using both:
   1) one or more radio-frequency signals transmitted from a transmitter on the first object of interest, and 2) optical character recognition of a uniform number on the first object of interest.

15. The system of claim 9, wherein to determine that the position information for the first object of interest is correlated with the fields of view corresponding to the first portions of the media content, the one or more computing devices are further configured to:
   partition the field of play into a plurality of grid positions;
   determine for each grid position in the plurality of grid positions a probability that the first object of interest occupies the respective grid position;
   determine that each field of view in the fields of view in the first portions of the media content includes the grid position in the plurality of grid positions with a highest probability that the first object of interest occupies the respective grid position.

16. The system of claim 9, wherein the one or more computing devices are further configured to:
   determine a first dynamic characteristic for the first object of interest using the position information for the first object of interest;
   generate first metadata representing the first dynamic characteristic; and
   integrate the first metadata with one or more of the first portions of the media content, wherein the first metadata represent one or more of an accuracy of an officiating event, or a likelihood of success of a particular play.

17. A computer-implemented method, comprising:
   receiving, by one or more servers, media content representing an athletic event having a plurality of players associated therewith, the media content including a plurality of portions of the media content, each portion of the media content corresponding to one of a plurality of cameras having different fields of view relative to the athletic event;
   receiving, by the one or more servers, position information for a subset of the plurality of players, the position information representing a position for each player in the subset of the plurality of players relative to a field of play associated with the athletic event;
   receiving position information for a subset of the plurality of players, the position information representing a position for each player in the subset of the plurality of players relative to a field of play associated with the athletic event;
   generating, by the one or more servers, a first temporal sequence of first portions of the media content from among the plurality of portions of the media content based on the position information for a first player, the first portions of the media content being selected such that the position information for the first player is correlated with the fields of view corresponding to the first portions of the media content;
   generating, by the one or more servers, first manifest data representing playback options of the media content, the playback options including a first playback option corresponding to the first player, and wherein the first portions of the media content include a first portion from a first camera having a first field of view, and a second portion from a second camera having a second field of view;
   receiving, by the one or more servers, a first request to view the media content from a first device, the first request identifying a first player in the subset of the plurality of players;
   providing, by the one or more servers, the first manifest data for playback of the media content at the first device;
   receiving, by the one or more servers, a second request from the first device to view the first playback option, the second request identifying a first dynamic characteristic for the first player;
   determining the first dynamic characteristic for the first player using the position information for the first player;
   generating first metadata representing the first dynamic characteristic;
   integrating the first metadata with one or more of the first portions of the media content; and
   streaming, by the one or more servers, the first metadata and the first portions of the media content to the first device;
   receiving, by the one or more servers, a second request to view the media content from a second device, the second request identifying a second player of the plurality of players;
   determining that position information for the second participant is not available; and
   streaming to the second device a subset of the first temporal sequence, the subset of the first temporal sequence corresponding to a subset of the first portions of the media content, based on determining that a probability that the second player is visible in the subset of the first portions of the media content exceeds a threshold.

18. The computer implemented method of claim 17, wherein the first metadata represent one or more of an accuracy of an officiating event, or a likelihood of success of a particular play.

* * * * *